(12) United States Patent
Hornbrook et al.

(10) Patent No.: US 7,000,748 B2
(45) Date of Patent: Feb. 21, 2006

(54) CLUTCH BRAKE

(75) Inventors: Michael J. Hornbrook, Butler, IN (US); Steven E. McCutcheon, Fort Wayne, IN (US)

(73) Assignee: Eaton Corporation, Cleveland, OH (US)

( * ) Notice: Subject to any disclaimer, the term of this patent is extended or adjusted under 35 U.S.C. 154(b) by 51 days.

(21) Appl. No.: 10/760,665

(22) Filed: Jan. 20, 2004

(65) Prior Publication Data

US 2005/0155832 A1  Jul. 21, 2005

(51) Int. Cl.
*F16D 67/02* (2006.01)

(52) U.S. Cl. .................. 192/13 R; 192/18 B; 188/164

(58) Field of Classification Search ............. 192/13 R, 192/18 B, 84.2; 188/164
See application file for complete search history.

(56) References Cited

U.S. PATENT DOCUMENTS

| | | | |
|---|---|---|---|
| 3,857,468 A | 12/1974 | Iritono et al. | |
| 3,893,191 A | 7/1975 | Gold et al. | |
| 4,014,420 A * | 3/1977 | Riese | 192/13 R |
| 4,222,471 A * | 9/1980 | Hsu | 192/18 B |
| 4,694,945 A | 9/1987 | Koitabashi | |
| 4,848,527 A * | 7/1989 | Kamio | 192/13 R |
| 5,172,798 A | 12/1992 | Mabee | |
| 5,209,085 A | 5/1993 | Brien | |
| 5,533,425 A | 7/1996 | Mabee | |
| 5,931,274 A * | 8/1999 | Sakurai et al. | 192/84.961 |

FOREIGN PATENT DOCUMENTS

EP   0822354 A2 *  2/1998

* cited by examiner

*Primary Examiner*—Richard M. Lorence
(74) *Attorney, Agent, or Firm*—Radar, Fishman & Grauer PLLC

(57) ABSTRACT

A clutch brake is provided that includes a brake housing adapted to be non-movably secured relative to a driveline master clutch. The brake housing includes a through-hole sized to allow passage of a shaft and at least one source of magnetic flux. The clutch brake also includes an armature secured for rotation with the shaft and positioned axially adjacent the brake housing in a disengaged state. At least a portion of the armature is adapted to move axially on the shaft in the presence of magnetic flux to contact the brake housing in an engaged state and inhibit rotation of the armature and the shaft.

30 Claims, 13 Drawing Sheets

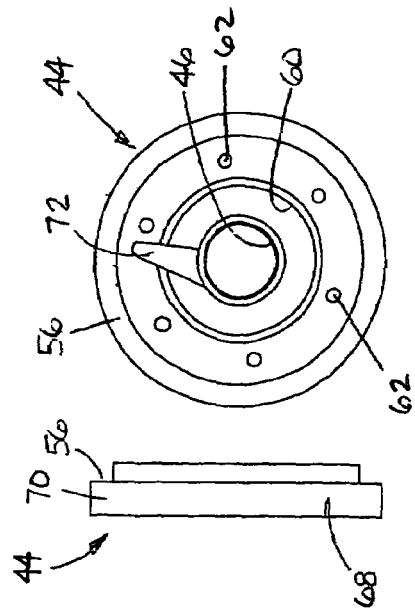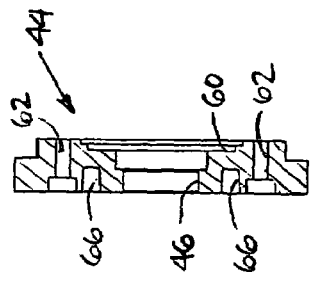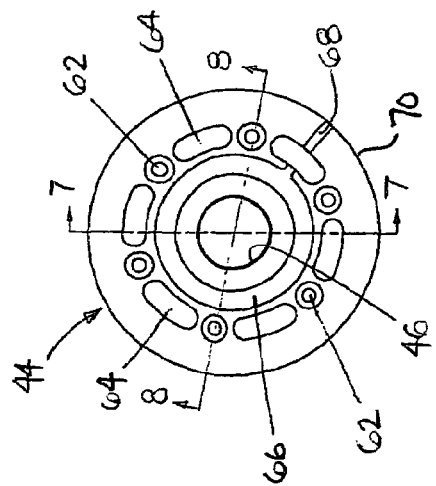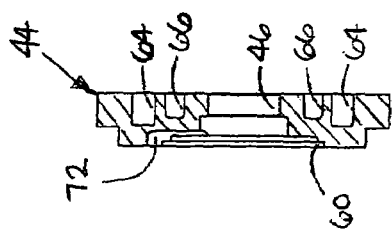

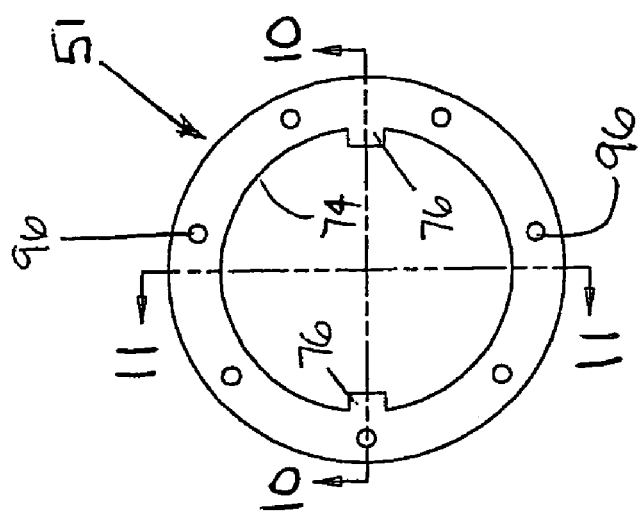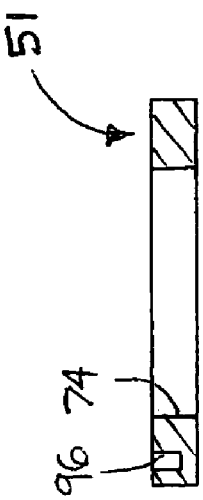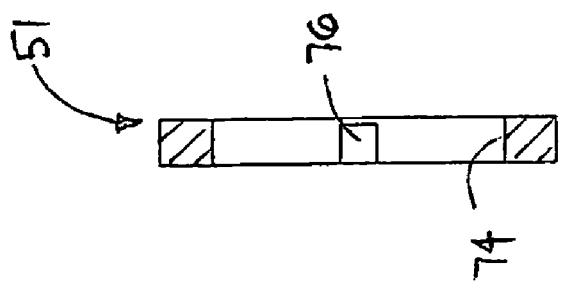

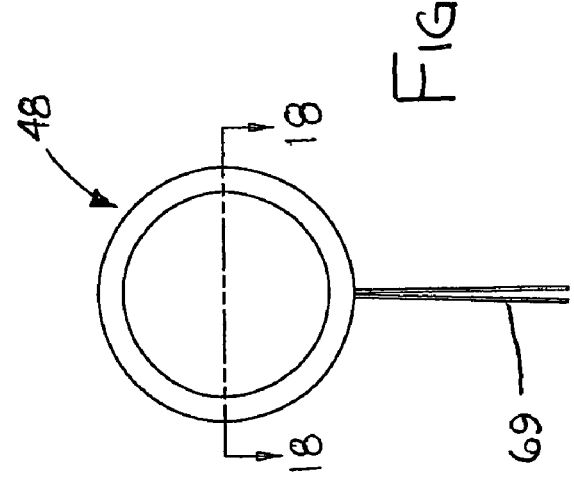
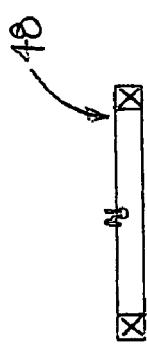
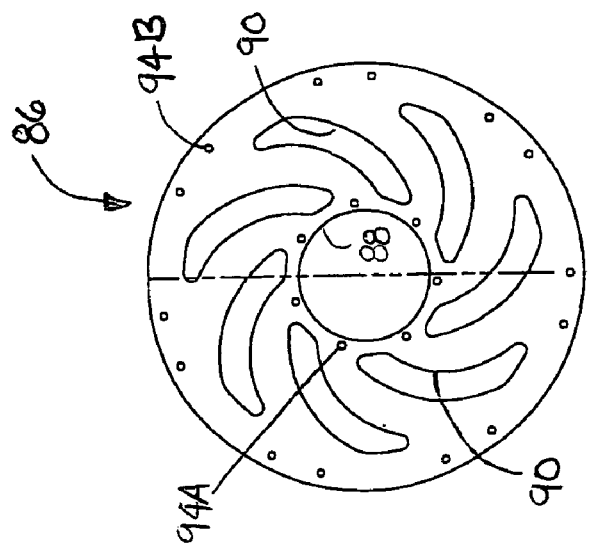

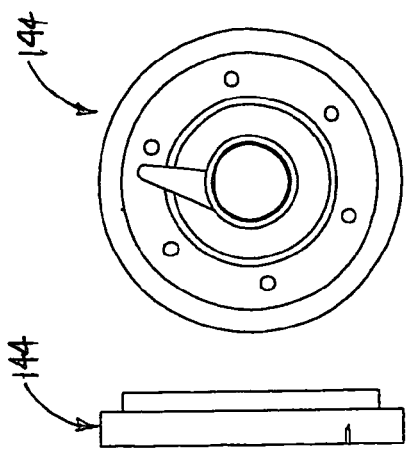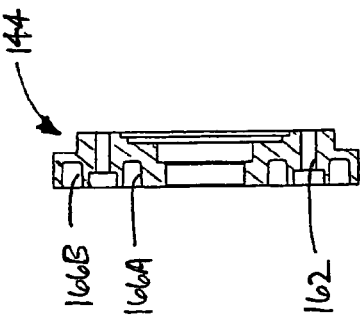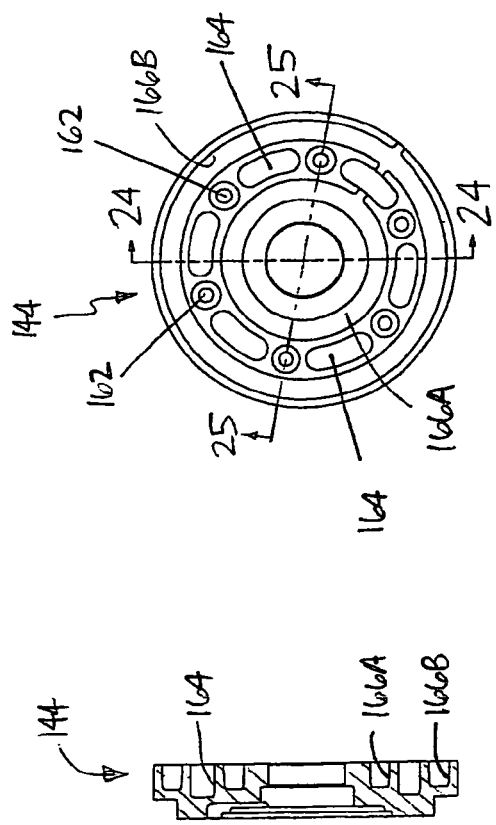

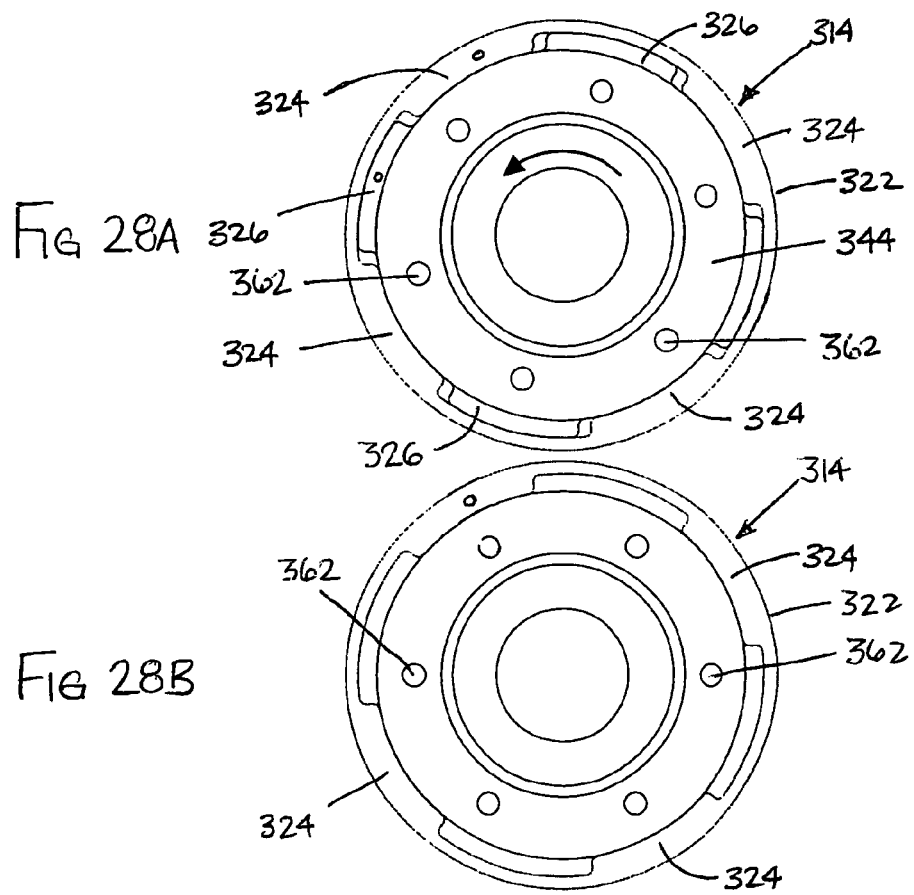
FIG 28A
FIG 28B
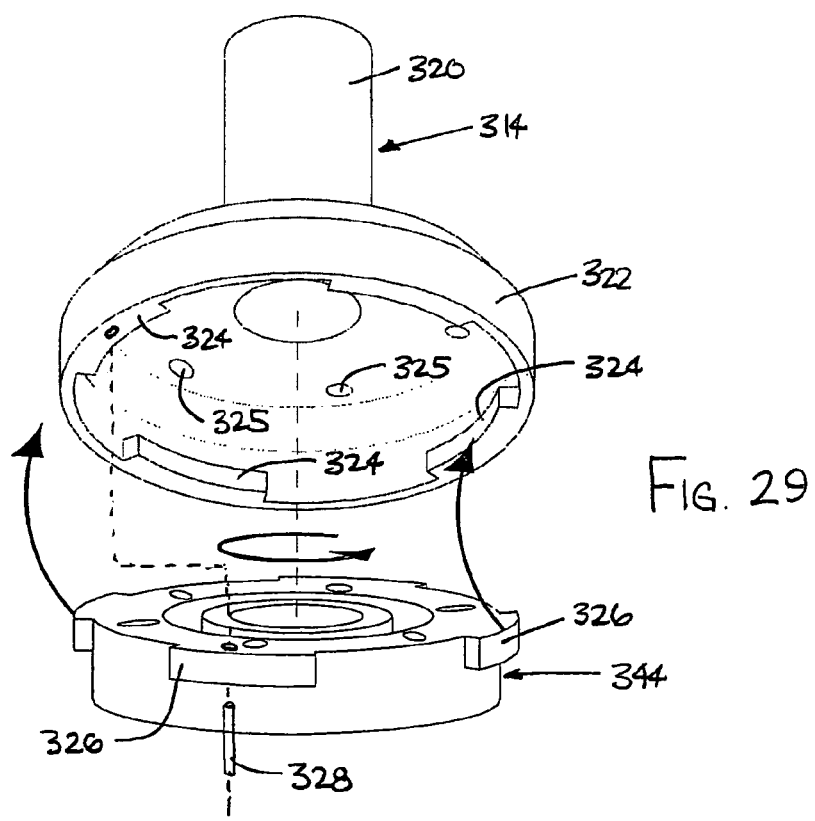
FIG. 29

CLUTCH BRAKE

BACKGROUND OF THE INVENTION

1. Field of the Invention

The present invention relates to heavy-duty driveline master clutches of the type used in large vehicles such as trucks, tractor-trailers or the like and, more particularly, to a clutch brake for use with a driveline master clutch.

2. Description of the Related Art

The use and function of a clutch brake is well known in the art of vehicle driveline systems. A clutch brake is a device used to rapidly slow the rotational speed of a transmission input shaft when a driveline master clutch is disengaged to facilitate the shifting of gears in the transmission. Without a clutch brake, the time required to shift a transmission would be significantly increased, thereby complicating operation of the transmission in various driving modes.

A conventional clutch brake is a disc-shaped device, a portion of which is splined to the input shaft of the transmission and is activated by a master clutch release mechanism when the master clutch is disengaged. Upon disengagement of the master clutch, friction elements of the clutch brake are pressed between a transmission housing and the release mechanism to create frictional drag that slows the rotating transmission input shaft to facilitate gear shifting.

Normally, a release bearing, which is the operating portion of the release mechanism, moves between engaged (nearer the clutch) and disengaged (nearer the transmission) positions causing the master clutch to selectively connect and disconnect the transmission input shaft from the engine. When the release bearing is moved within a normal shifting range, the clutch brake is not engaged. However, when it is desired to rapidly slow rotation of the transmission input shaft to facilitate a gear shift, the release mechanism is moved beyond the normal shift range so as to trap and clamp the clutch brake between the release bearing and the transmission housing. When so moved, rotation of a splined brake disc is slowed or stopped and, consequently, the transmission input shaft is slowed or stopped.

In a "wear-through" style master clutch, the disengaged position of the release bearing is not consistently maintained over the life of the frictional components of the master clutch. Therefore, traditional clutch brakes that operate by engagement with a release bearing are not compatible with a "wear-through" style master clutch. Accordingly, there is a need for an improved clutch brake whose operation is not effected by engagement with a release bearing.

SUMMARY OF THE INVENTION

A clutch brake is provided that includes a brake housing adapted to be non-movably secured relative to a driveline clutch. The brake housing includes a through-hole sized to allow passage of a shaft and at least one source of magnetic flux. The clutch brake also includes an armature secured for rotation with the shaft and positioned axially adjacent the brake housing in a disengaged state. At least a portion of the armature is adapted to move axially on the shaft in the presence of magnetic flux to contact the brake housing in an engaged state and inhibit rotation of the armature and the shaft.

BRIEF DESCRIPTION OF THE DRAWINGS

Embodiments of the invention will now be described, by way of example, with reference to the accompanying drawings, wherein:

FIG. 4 is a front elevation view of a brake housing according to an embodiment of the present invention, for use in the clutch brake of FIGS. 1–3;

FIG. 5 is a side elevation view of the brake housing of FIG. 4;

FIG. 6 is a rear elevation view of the brake housing of FIG. 4;

FIG. 7 is a cross-section view of the brake housing of FIG. 4 taken along lines 7—7;

FIG. 8 is a cross-section view of the brake housing of FIG. 4 taken along lines 8—8;

FIG. 9 is an elevation view of a shaft collar according to an embodiment of the present invention, for use in the clutch brake of FIGS. 1–3;

FIG. 10 is a cross-section view of the shaft collar of FIG. 9 taken along lines 10—10;

FIG. 11 is a cross-section view of the shaft collar of FIG. 9 taken along lines 11—11;

FIG. 16 is an elevation view of a return spring according to an embodiment of the present invention, for use in the clutch brake of FIGS. 1–3;

FIG. 17 is an elevation view of a coil according to an embodiment of the present invention, for use in the clutch brake of FIGS. 1–3;

FIG. 18 is a cross-section view of the coil of FIG. 17 taken along lines 18—18;

FIG. 21 is a front elevation view of a brake housing according to an embodiment of the present invention, for use in the clutch brake of FIGS. 19 and 20;

FIG. 22 is a side elevation view of the brake housing of FIG. 21;

FIG. 23 is a rear elevation view of the brake housing of FIG. 21;

FIG. 24 is a cross-section view of the brake housing of FIG. 21 taken along lines 24—24;

FIG. 25 is a cross-section view of the brake housing of FIG. 21 taken along lines 25—25;

FIGS. 28A and 28B are end views of the clutch brake and quill in a preinstalled position and an installed position, respectively;

FIG. 29 is a perspective view of an embodiment of a brake housing and a quill housing shown in FIGS. 28A and 28B, prior to installation into a driveline system;

DETAILED DESCRIPTION OF THE INVENTION

Figure 1:
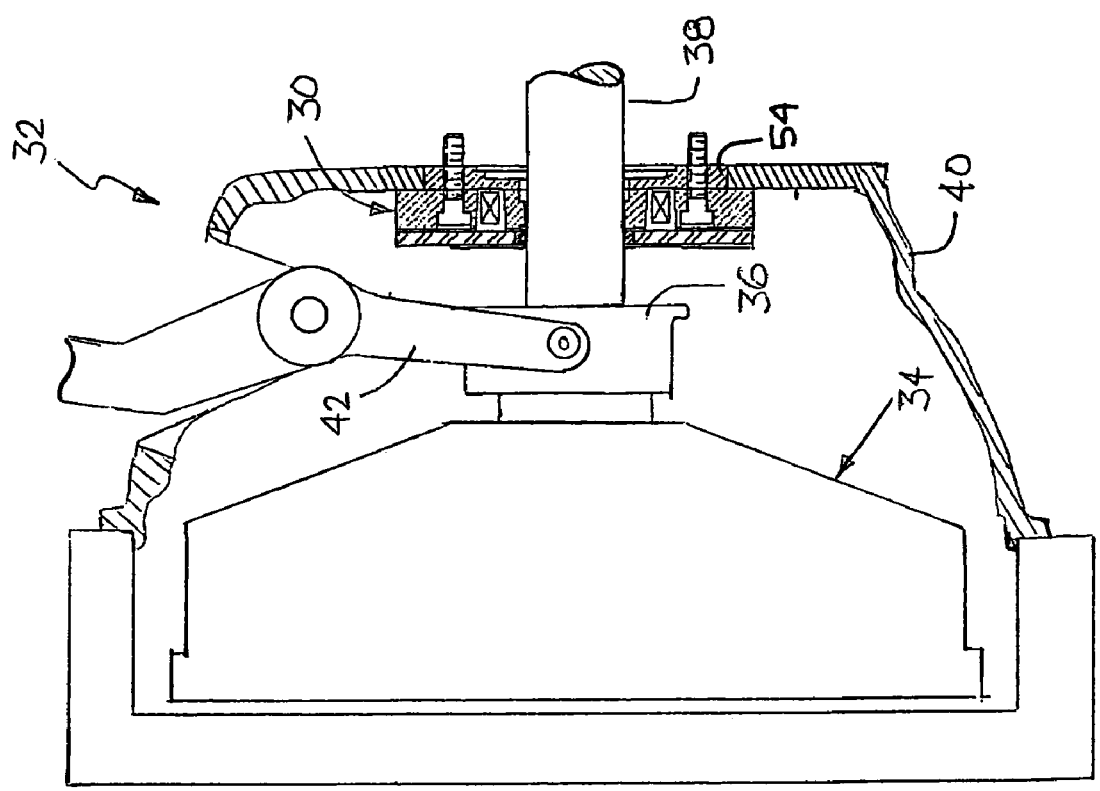
FIG. 1 is a partial cross-section view of a driveline master clutch, including a clutch brake according to an embodiment of the present invention.

Referring now to the drawings, various embodiments of the present invention are described in detail. Certain terminology will be used in the following description for convenience in reference only and will not be limiting. For example, the terms "transmission" and "master clutch" as used herein shall include all types of gear change transmissions, including single countershaft and twin countershaft types and all types of driveline master clutches, respectively. Further, while the braking apparatus of the present invention may be used in various applications requiring the rotational slowing of a shaft, the present invention is particularly suited for use as a clutch brake for slowing rotation of a transmission input shaft disposed between a driveline master clutch and a transmission of a motor vehicle, and will be described in connection therewith.

Referring to FIG. 1 of the drawings, a side elevation view of a clutch brake 30 of the present invention is shown installed in a vehicle driveline system 32. In driveline system 32, a master clutch 34 is engaged and disengaged by a clutch release bearing 36 positioned around an input shaft 38 of a change-gear transmission (not shown). Clutch release bearing 36 may function as an input shaft style release system or as a quill-style release system, the latter being described in further detail below. Master clutch 34 and release bearing 36 are shown generically in FIG. 1 for simplicity.

In the illustrated embodiment, driveline system 32 includes a transmission bell housing 40 within which clutch brake 30 is mounted. Release bearing 36 is movable within transmission housing 40 between engaged (nearer the clutch) and disengaged (nearer the transmission) positions by a release bearing actuating member 42 (e.g., a release fork), allowing master clutch 34 to selectively connect and disconnect transmission input shaft 38 from a vehicle prime mover, such as an internal combustion engine (not shown). Clutch brake 30 is operated when it is desired to slow rotation of transmission input shaft 38, such as when the transmission is shifted from one gear to another.

Figure 3:
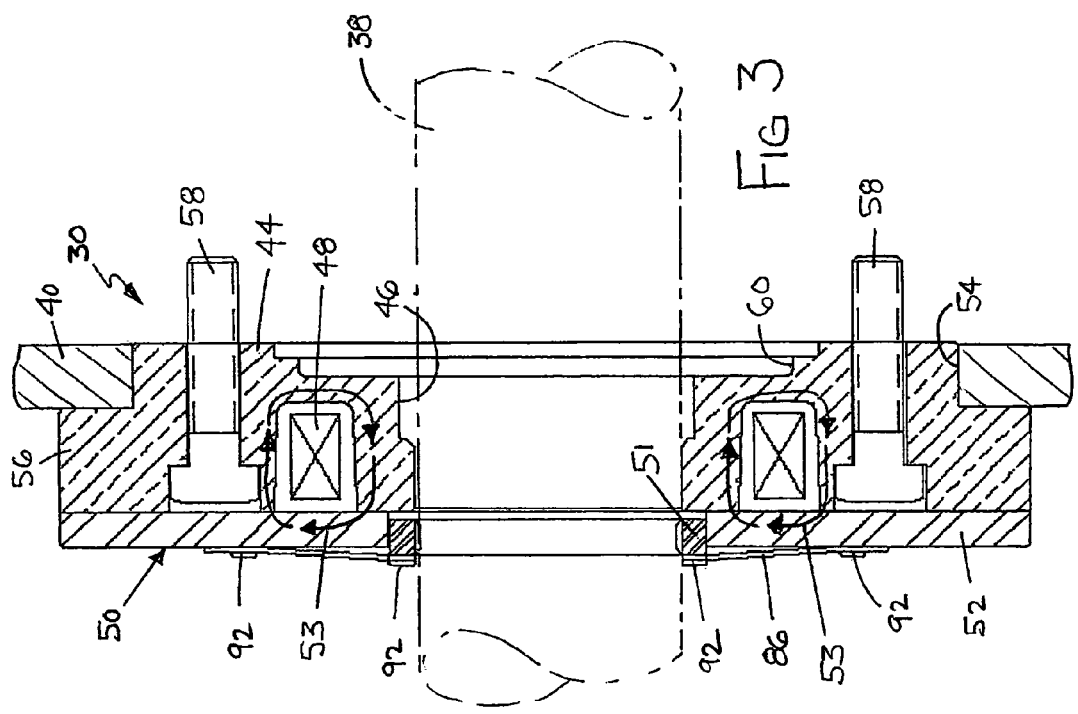
FIG. 3 is a cross-section view of the clutch brake of FIG. 1, showing the clutch brake in an engaged state.
Figure 2:
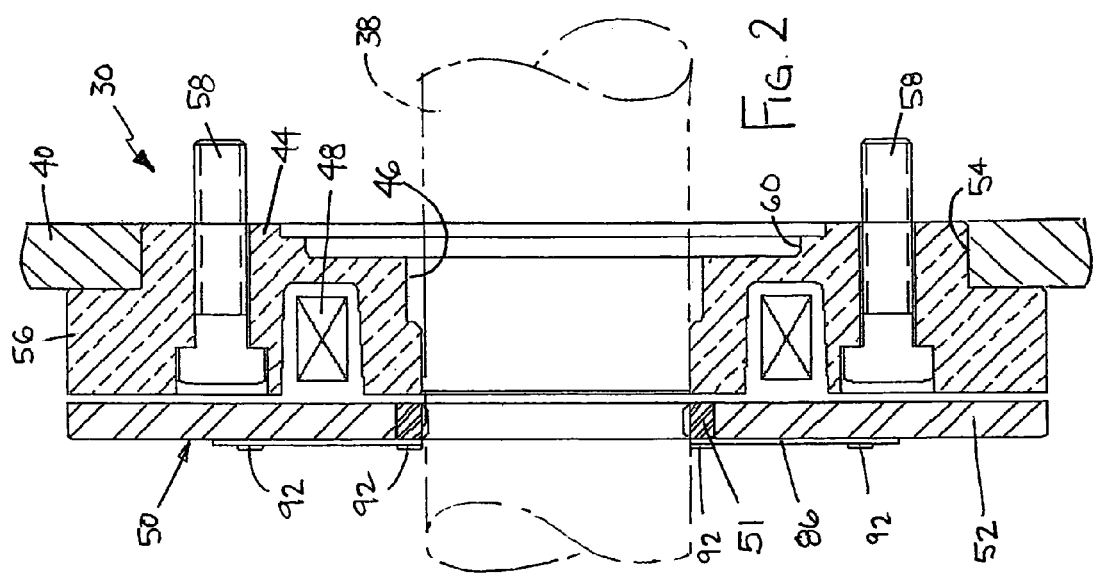
FIG. 2 is a cross-section view of the clutch brake of FIG. 1, showing the clutch brake in a disengaged state.
Figure 12:
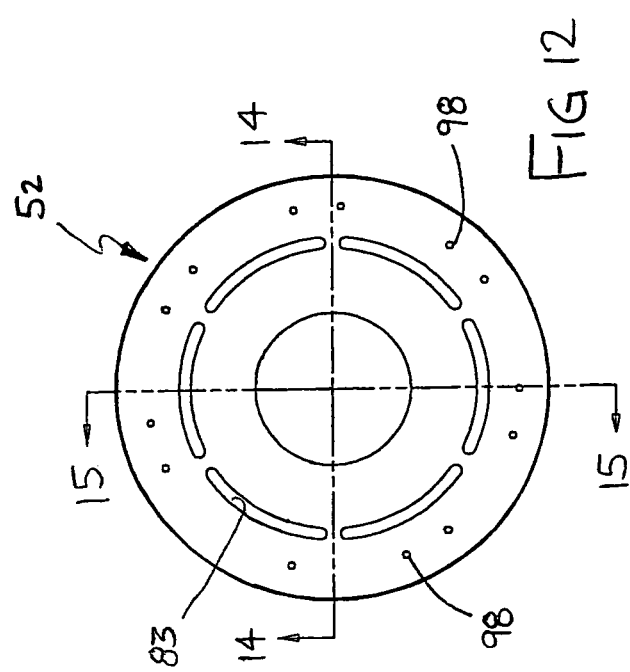
FIG. 12 is a front elevation view of an armature plate according to an embodiment of the invention, for use in the clutch brake of FIGS. 1–3.
Figure 14:
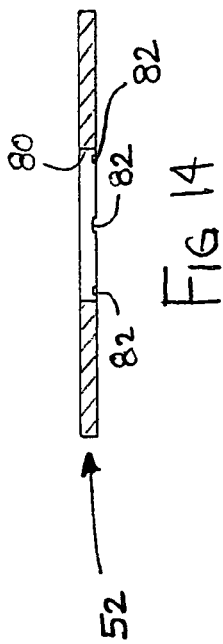
FIG. 14 is a cross-section view of the armature plate of FIG. 12 taken along lines 14—14.
Figure 15:
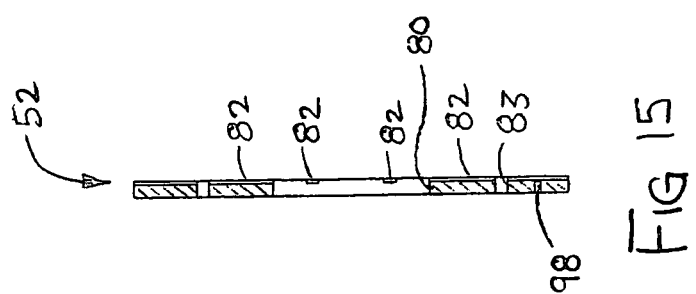
FIG. 15 is a cross-section view of the armature plate of FIG. 12 taken along lines 15—15.
Figure 13:
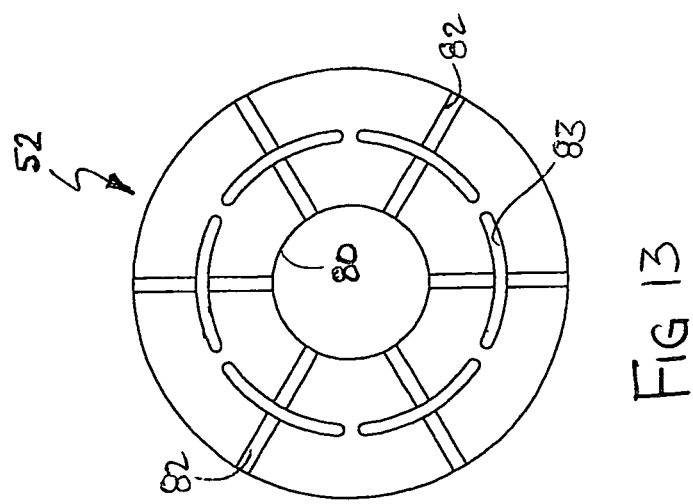
FIG. 13 is a rear elevation view of the armature plate of FIG. 12.

Referring to FIGS. 2 and 3 of the drawings, a cross-section view of clutch brake 30 according to an embodiment of the present invention is shown. In the illustrated embodiment, clutch brake 30 includes a brake housing 44 having a through-hole 46 sized to allow passage of input shaft 38, and a source of magnetic flux 48, such as an electromagnetic coil. Clutch brake 30 also includes an armature 50 of known magnetic properties secured for rotation with input shaft 38 and positioned axially adjacent brake housing 44 in a disengaged state (shown in FIG. 2). In an embodiment, armature 50 includes a shaft collar 51 secured for rotation with input shaft 38 and an armature plate 52 surrounding shaft collar 51. Armature plate 52 is adapted to move axially relative to input shaft 38 and shaft collar 51 in the presence of a magnetic field (represented by lines of magnetic flux 53 in FIG. 3) to contact brake housing 44 in an engaged state and inhibit rotation of armature 50 and input shaft 38.

Figure 33:
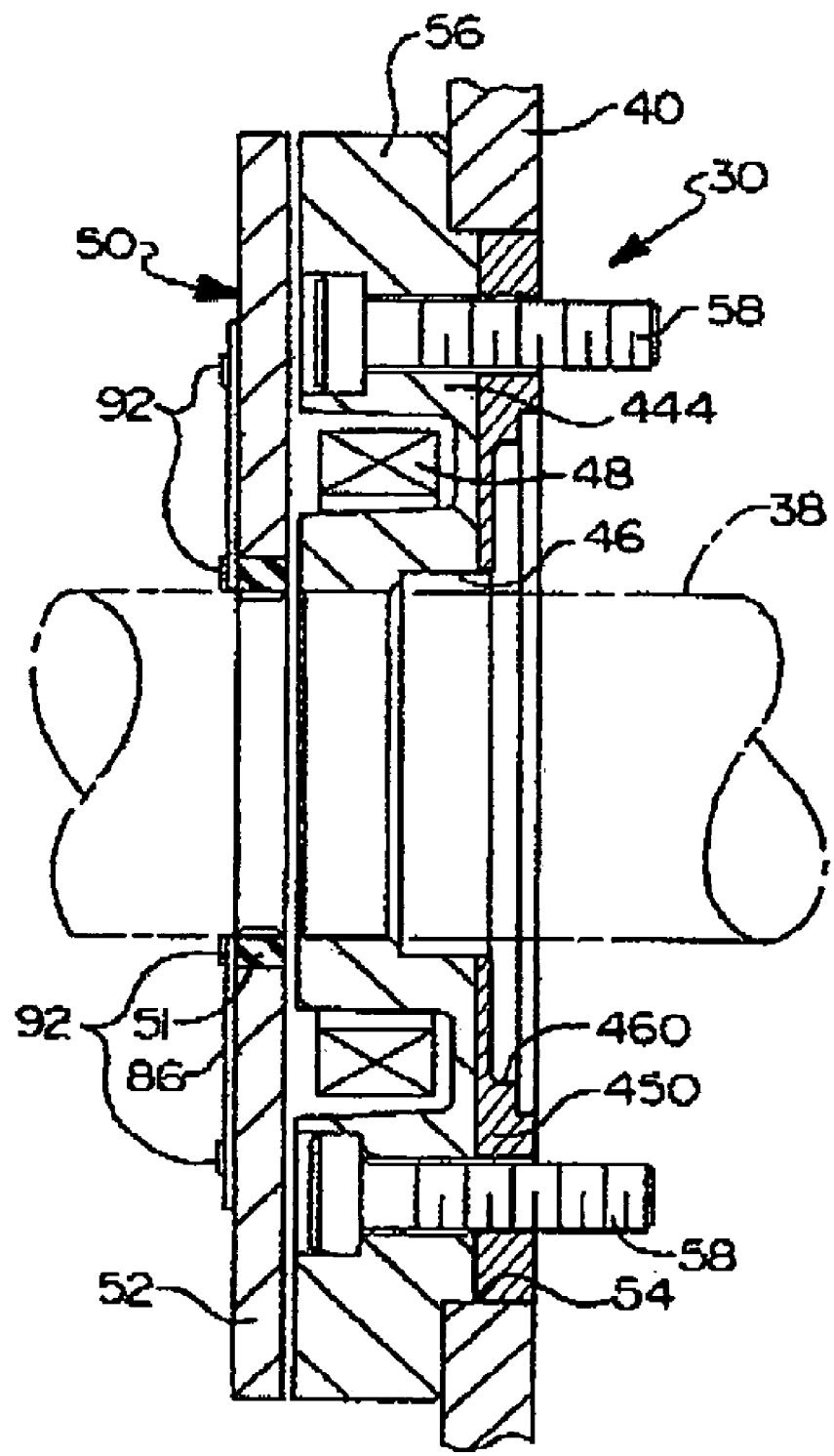
FIG. 33 is a cross-section view of a clutch brake according to a further embodiment.

As shown in the embodiment of FIGS. 1 and 2, brake housing 44 is adapted to be received into an opening 54 in transmission housing 40. A flange 56 on brake housing 44 prevents clutch brake 30 from falling through opening 54 and a number of fasteners 58, such as bolts or the like, non-movably secure transmission housing 40 to a component of driveline system 32, such as a portion of the transmission for example. In a particular implementation of the invention, brake housing 44 is installed in an SAE No. 2 transmission housing 40 and is configured with one or more chamfers 60 that accommodate and secure the front bearing seals of a mating transmission. In this configuration, brake housing 44 replaces the traditional bearing cap used to retain the front bearing seals of the transmission. However, brake housing 44 may exhibit configurations other than the configuration shown in FIGS. 1–3, particularly when clutch brake 30 does not need to function as a bearing cap. As best seen in FIG. 33, an alternative embodiment of brake housing 44 includes a brake housing 444 adjacent a bearing cap 450 that includes a chamfer 460 to secure the front bearing seals of a mating transmission.

Referring to FIGS. 4–8, brake housing 44 is a generally cylindrical structure that includes a number of chamfered holes 62, each sized to receive bolt 58. Between holes 62 are a number of optional mass-removing voids 64. Because brake housing 44 is made of a relatively heavy material, such as steel, voids 64 may be employed to reduce the overall weight of the component. Radially inward of holes 62 and voids 64 is an annular groove 66 seized to receive the source of magnetic flux 48. A radially extending groove 68 extends from annular groove 66 outward to a circumferential outer surface 70 of flange 56. When the source of magnetic flux includes an electromagnetic coil, groove 68 allows passage of electrical wires 69 (FIG. 17) that supply power to the coil. In the illustrated embodiment, brake housing 44 also includes a lubrication recess 72 that facilitates the flow of lubricating oil into chamfers 60 that accommodate the bearing seals of the transmission bearing.

Referring to FIGS. 9–11 an embodiment of shaft collar 51 is shown. In the illustrated embodiment, shaft collar 51 is annular in shape having a through-hole 74 sized to allow passage of input shaft 38. At least one locking tab 76 extends radially inward into through-hole 74 and is sized to mate with corresponding slots (not shown) on input shaft 38, which lock shaft collar 51 for rotation with input shaft 38. While shaft collar 51 is shown as having a pair of locking tabs 76 spaced approximately 180 degrees apart, the number of locking tabs 76 and the orientation of locking tabs 76 are not intended to be limited thereto.

Referring to FIGS. 12–15, an embodiment of armature plate 52 is shown. In the illustrated embodiment, armature plate 52 is also annular in shape having a through-hole 80 sized for receipt of shaft collar 51. Optionally, armature plate 52 may also include a number of radially extending grooves 82. Axial grooves 82 enhance airflow across armature plate 52 to cool armature plate and brake housing 44 and permit debris to flow outward from between armature plate and brake housing 44 during operation of driveline system 32.

Referring to FIG. 16, a return spring 86 is shown for securing armature plate 52 to shaft collar 51. In an embodiment, return spring 86 is made from a resiliently deflectable material, such as SAE 1075 spring steel, and is annular in shape. Return spring 86 includes a through-hole 88 sized to allow passage of input shaft 38 and a number of spiral-shaped gaps 90. The size of gaps 90 impact the spring rate of return spring 86. Generally, the larger the gaps, the lower the spring rate of return spring 86. While the spiral-shaped gaps 90 shown in FIG. 16 have been found to reduce stress risers that fatigue return spring 86, other gap shapes are also within the scope of the invention.

Return spring 86 is secured to shaft collar 51 and armature plate 52 using a number of fasteners 92 (FIGS. 1 and 2), such as rivets or the like. To accommodate fasteners 92, return spring 86 includes a number of holes 94, including inner holes 94A and outer holes 94B. Inner holes 94A correspond to a number of holes 96 (FIGS. 9 and 10) in shaft collar 51 and outer holes correspond to a number of holes 98 (FIGS. 12 and 15) in armature plate 52.

Figure 20:
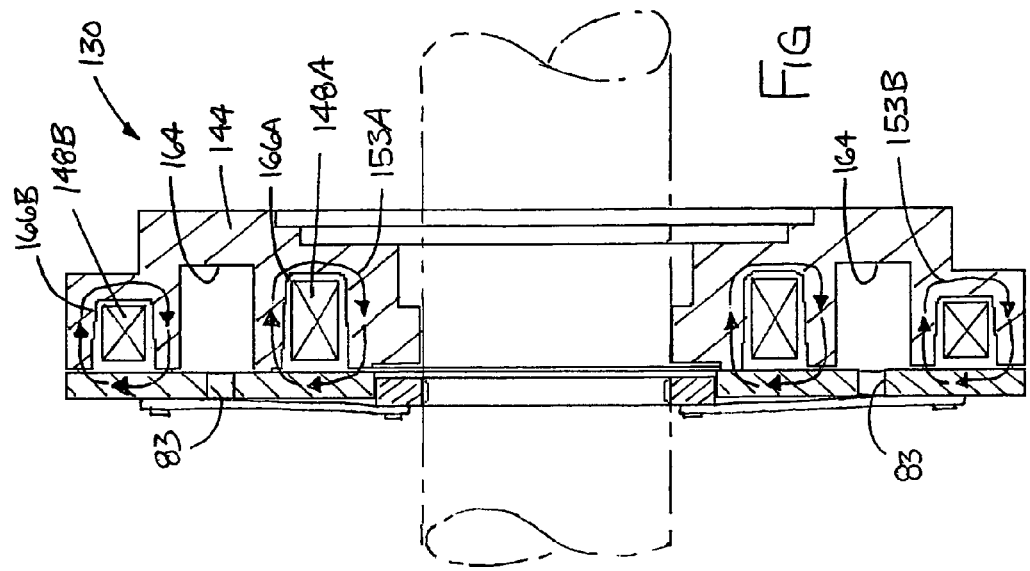
FIG. 20 is a cross-section view of the clutch brake of FIG. 19, showing the clutch brake in an engaged state.
Figure 19:
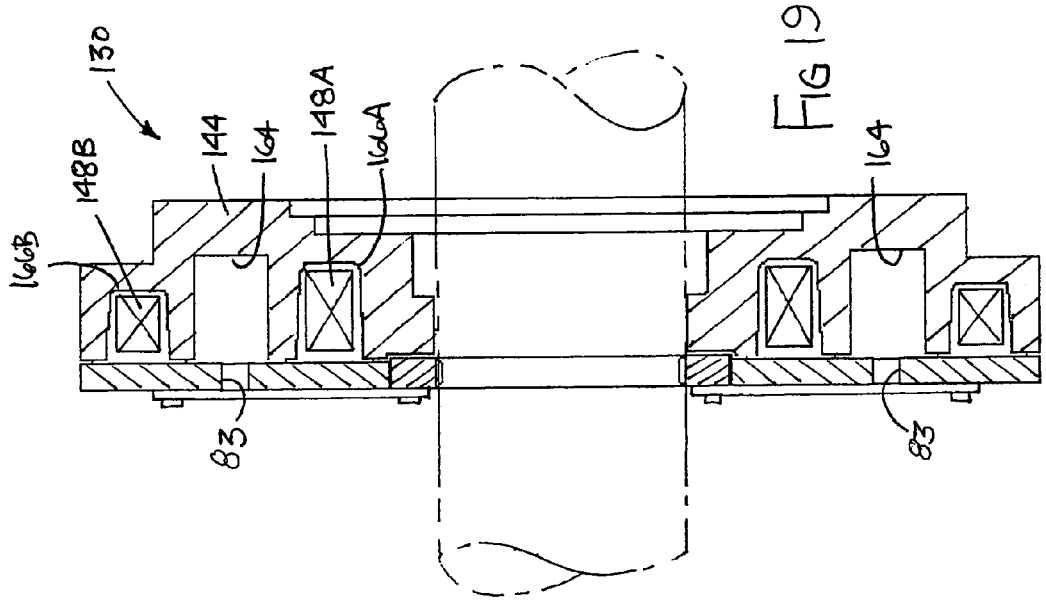
FIG. 19 is a cross-section view of a clutch brake according to another embodiment of the present invention, showing the clutch brake in a disengaged state.

Referring to FIGS. 19 and 20, a clutch brake 130 according to another embodiment of the present invention is shown. In the illustrated embodiment, clutch brake 130 is substantially similar to clutch brake 30 described above with at least one exception, namely, clutch brake 130 includes at least two sources of magnetic flux 148A and 148B. To accommodate the two sources of magnetic flux, clutch brake 130 includes a brake housing 144 having an inner annular groove 166A and an outer annular groove 166B. A shown in FIGS. 22–25, outer annular groove 166B is positioned radially outward of holes 162 and voids 164 in brake housing 144. To maintain the two distinct magnetic fields (153A and 153B in FIG. 20) associated with each source of magnetic flux 148A and 148B, armature plate 52 may include a number of circumferentially extending arcuate slots 83 (see also FIGS. 12 and 13). As shown in FIG. 20, the position of slots 83 inhibits the lines of magnetic flux in one magnetic field from short-circuiting through armature plate 52 and into the neighboring magnetic field.

Figure 26:
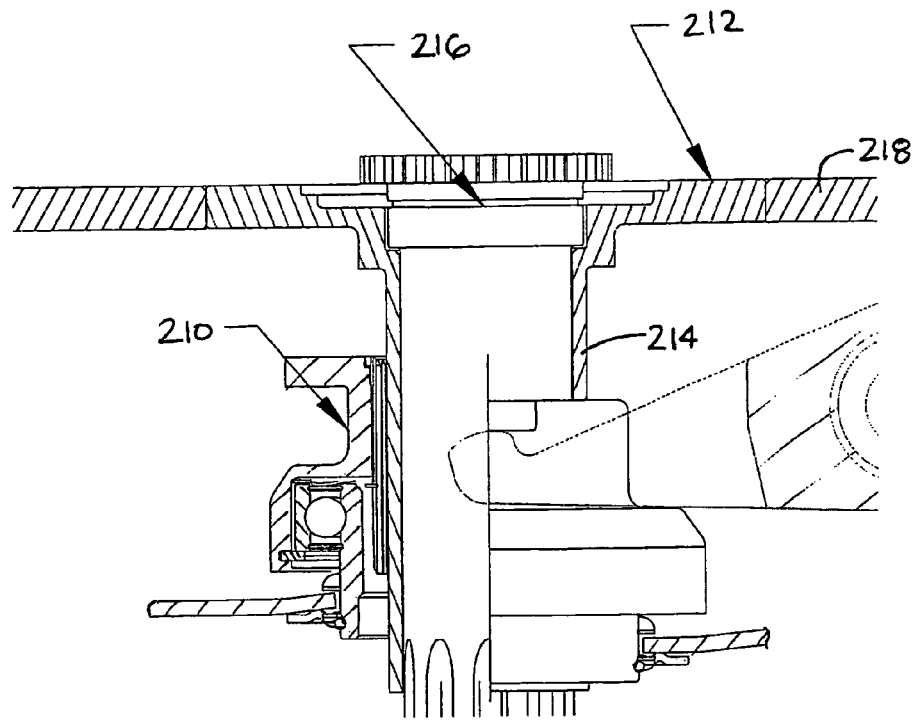
FIG. 26 is a partial cross-section view of a prior art quill-style clutch release system.

As noted above, clutch brake 30, 130 is compatible with, among other clutch release systems, a quill-style release system. A prior art quill-style release system is shown in FIG. 26 and includes a release bearing 210, a transmission front bearing cap 212 with an integral quill 214, and a transmission input shaft 216.

Figure 27:
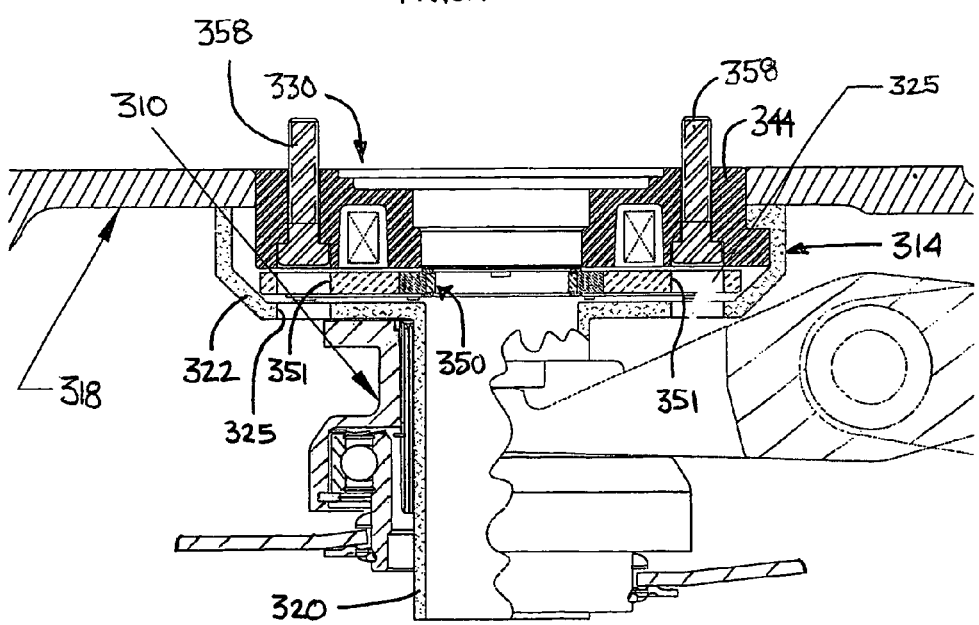
FIG. 27 is a partial cross-section view of a quill-style clutch release system employing a clutch brake according to an embodiment of the present invention.
Figure 30:
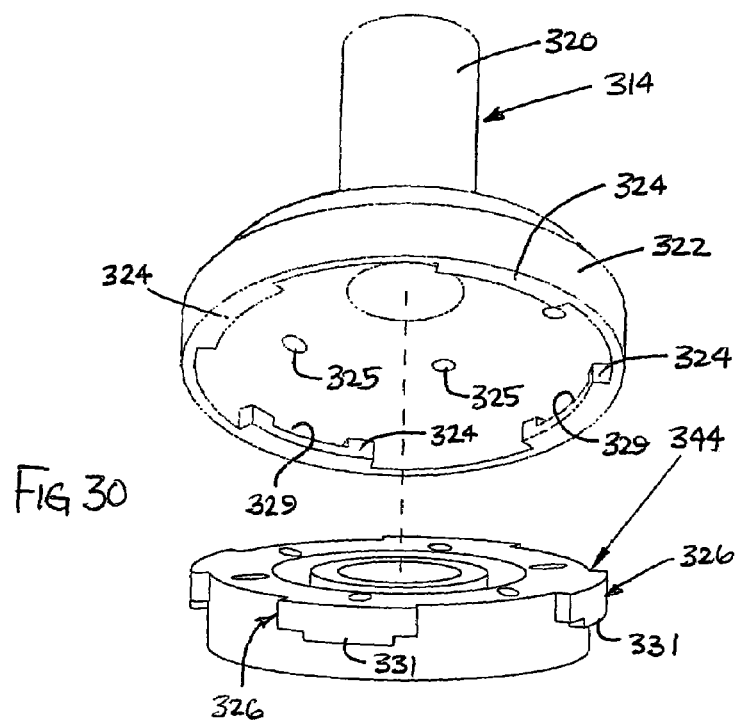
FIG. 30 is a perspective view of a clutch housing and a quill housing according to another embodiment of the present invention.

Referring to FIG. 27, a quill-style clutch release system is shown that includes a clutch brake according to an embodiment of the present invention. The quill-style release system includes a release bearing 310, a quill 314 and a clutch brake 330 that is substantially similar to either of clutch brakes 30, 130 described above. In the embodiment illustrated in FIG. 27, quill 314 includes an axially extending cylindrical portion 320 and a housing 322 within which clutch brake 330 is received. Quill housing 322 includes a number of holes 325 sized to allow passage of bolts 358 used to secure clutch brake 330 within the driveline system. To accommodate these bolts, armature 350 may also include a corresponding number of holes 351.

As shown in the embodiment of FIGS. 28 and 29, housing 322 also includes a number of spaced apart quill flanges 324. The gaps between quill flanges 324 are sized to allow passage of a number of brake flanges 326 on a brake housing 344 of clutch brake 330. Once quill 314 is positioned over brake housing 344 and rotated, brake flanges 326 are radially aligned with quill flanges 324 on quill housing 322. Furthermore, holes 325 become aligned with holes 351 in armature 350 and holes 362 in brake housing 344. The bolts 258 that fasten clutch brake 330 to the driveline system also generate a clamping load that sandwiches quill flanges 324 between brake flanges 326 and transmission housing 318.

To inhibit movement of quill 314 relative to brake housing 344 prior to securing brake housing 344 to the driveline system, an optional slip pin 328 (e.g., a Spirol® pin) may be inserted into co-aligned holes in brake housing 344 and quill housing 322, as shown in FIG. 29. Alternatively, quill flanges 324 and brake flanges 326 may be "keyed" with appropriate notches 329 and tabs 331, respectively, which interlock when quill 314 and brake housing 344 are properly aligned and quill 314 is sandwiched between brake housing 344 and transmission housing 318.

Figure 31:
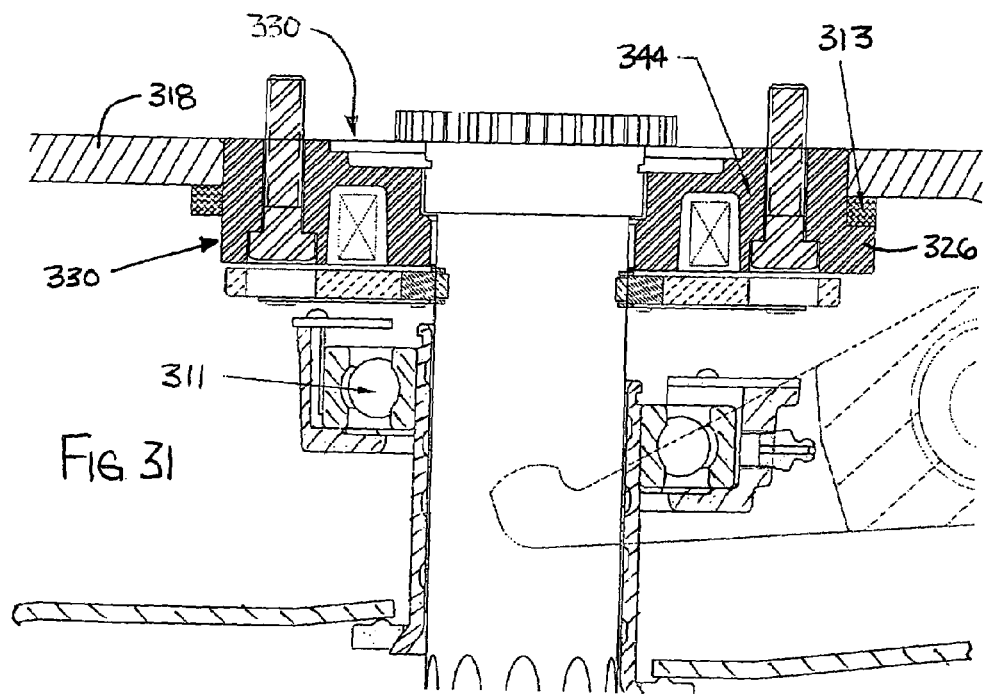
FIG. 31 is a partial cross-section view of an input shaft style clutch release system employing a clutch brake according to an embodiment of the present invention.

As noted above, the clutch brake of the present invention is not limited to use with quill-style clutch release systems. Referring to FIG. 31, the clutch brake of the present invention is shown with an input shaft style clutch release system. In the embodiment illustrated in FIG. 31, clutch brake 330 is shown installed adjacent an input shaft style release bearing 311. To accommodate the gap between brake flanges 326 and transmission housing 318 due to the absence of quill 314, a spacer member 313 may be positioned between brake flanges 226 and housing 318. While brake housing 344 may simply be manufactured for proper fit with transmission housing 318 (see, e.g., FIG. 1), use of spacer member 313 allows for a single brake housing configuration for both the quill-style and input shaft style release systems.

Figure 32:
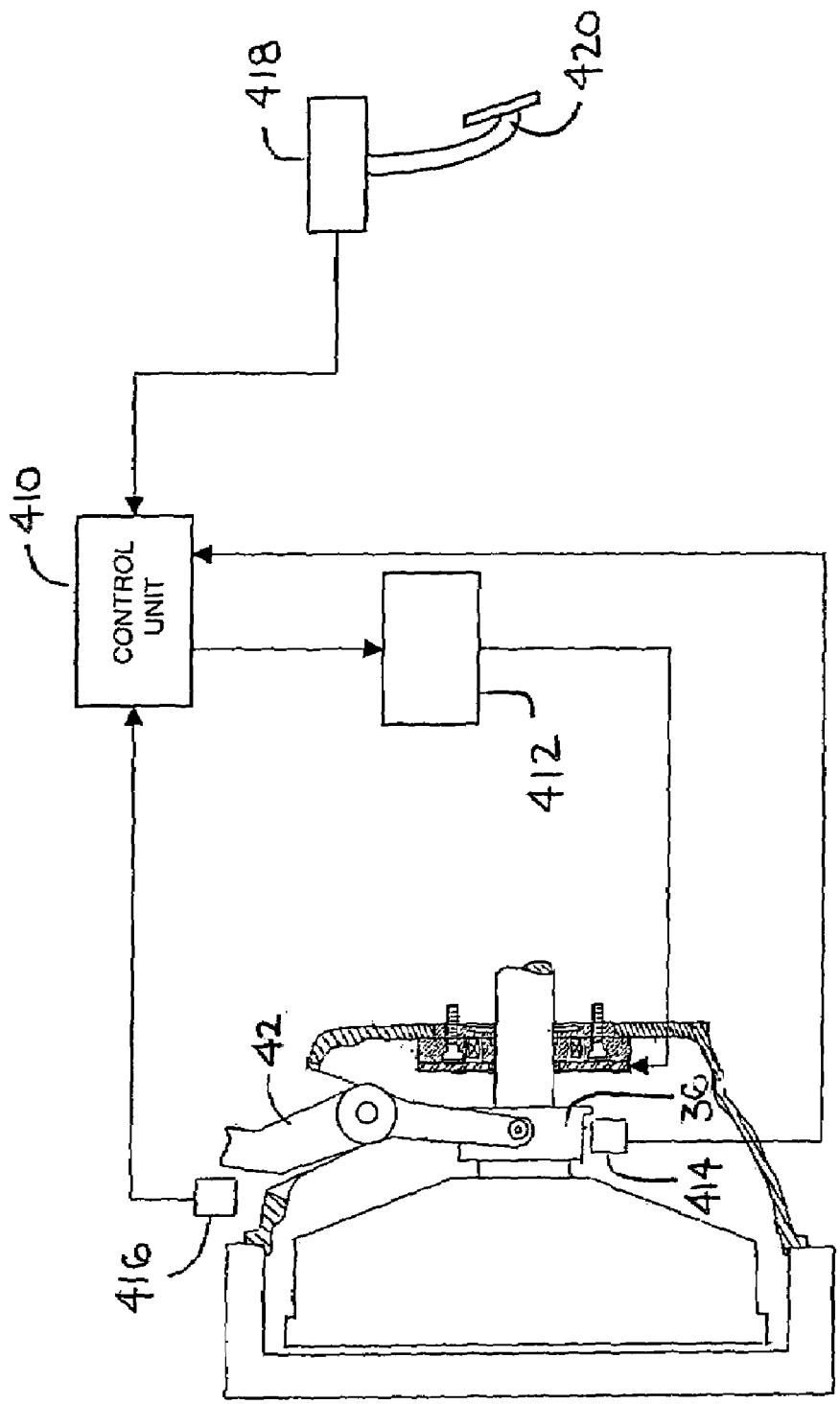
FIG. 32 is a schematic illustration of control system for controlling operation of the clutch brake of the present invention.

Referring to FIG. 32, a schematic illustration of a control system is shown for controlling operation of clutch brake 30, 130, 330. In the illustrated embodiment, the control system includes a microprocessor based control unit 410 that is provided in communication with clutch brake 30 via a controller 412 that supplies power to operate clutch brake 30 in response to an input from control unit 410. The control system may also include one or more sensors for sensing an operating condition of driveline system 32. For example, the control system may include a sensor 414 for determining the position of release bearing 36 or a sensor 416 for determining the position of release bearing actuating member 42. Suitable sensors for determining the position of release bearing 36 or release bearing actuating member 42 include inductive sensors or mechanical switches, both of which are known in the art.

Alternatively, or in combination with one or both of sensors 414, 416, the control system may include a sensor 418 for determining the position of a vehicle clutch pedal 420. Suitable sensors for determining the position of a clutch pedal include a Hall Effect switch or a mechanical switch, both of which are also known in the art.

Referring to FIGS. 2, 3 and 32, operation of clutch brake 30 and driveline system 32 will be described. In an embodiment, when master clutch 34 is disengaged and rotational power applied to input shaft 38 is interrupted, control unit 410 receives one or more inputs from sensors 414, 416 and/or 418 indicative of the disengaged state of master clutch 34. Upon determination that master clutch 34 is disengaged, control unit 410 provides an output to controller 412 instructing operation of clutch brake 30. Upon receipt of this instruction, controller 412 provides power to the source of magnetic flux 48 operating as an electromagnetic coil. In an embodiment, the electromagnetic coil is configured to operate off of vehicle battery power (e.g., 12 V dc). In a particular configuration, the source of magnetic flux 48 draws no more than approximately 5 amps of current for operation. The application or termination of power to the source of magnetic flux 48 may be a step-wise function (i.e., ON or OFF) or any other function, such as a parabolic function, which allows for a controlled rate of engagement or disengagement.

Once energized, source of magnetic flux 48 generates a magnetic field (represented by the lines of magnetic flux 53 in FIG. 3), which pulls armature plate 52 toward brake housing 44 by overcoming the biasing force of return spring 86. In the engaged position shown in FIG. 3, the clamping force generated between armature plate 52 and brake housing 44 by the magnetic field inhibits rotation of input shaft 38. When the magnetic field is removed, the biasing force of return spring 86 causes armature plate 52 to return to the disengaged position shown in FIG. 2 and input shaft 38 is free to rotate.

Operation of clutch brake 130 is substantially similar to clutch brake 30 except for the application of a second, distinct magnetic field. The magnetic fields produced by the two sources of magnetic flux 148A, 148B maybe generated separately or in combination, simultaneously, in a time delayed fashion or in any other manner warranted by the driveline system.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A clutch brake, comprising:
   a brake housing adapted to be non-movably secured in an axial direction relative to a driveline master clutch, the brake housing including at least two sources of magnetic flux and a through-hole sized to allow passage of a shaft; and
   an armature secured for rotation with the shaft and positioned axially adjacent the brake housing in a disengaged state, at least a portion of the armature adapted to move axially on the shaft in the presence of magnetic flux to contact the brake housing in an engaged state and inhibit rotation of the armature and the shaft, wherein the armature includes a number of slots positioned to separate lines of magnetic flux generated by a first source of magnetic flux from lines of magnetic flux generated by a second source of magnetic flux.

2. The clutch brake of claim 1, wherein the source of magnetic flux includes an electromagnetic coil.

3. The clutch brake of claim 1, wherein the armature includes a shaft collar secured for rotation with the shaft and an armature plate surrounding the shaft collar and movable relative to the shaft and shaft collar in an axial direction.

4. The clutch brake of claim 3, wherein the armature includes a return spring attached to the armature plate and the shaft collar.

5. The clutch brake of claim 4, wherein the armature plate is adapted to move relative to the shaft collar between a first, disengaged position in the disengaged state and a second position engaged with the brake housing in the engaged state.

6. The clutch brake of claim 5, wherein the return spring is adapted to bias the armature plate toward the first, disengaged position when the armature plate is moved toward the second, engaged position.

7. The clutch brake of claim 1, wherein the brake housing is configured to function as a bearing cap.

8. A driveline clutch assembly, comprising:
   a master clutch for transmitting rotational power between a prime mover and a transmission input shaft
   a release bearing and a release bearing actuating member adapted to move the release bearing to engage and disengage the master clutch; and
   a clutch brake, including:
   a brake housing adapted to be non-movably secured in an axial direction relative to the master clutch, the brake housing including at least one source of magnetic flux and a through-hole sized to allow passage of a shaft; and
   an armature secured for rotation with the shaft and positioned axially adjacent the brake housing in a disengaged state, at least a portion of the armature adapted to move axially on the input shaft in the presence of magnetic flux to contact the brake housing in an engaged state to inhibit rotation of the armature and the input shaft.

9. The driveline clutch assembly of claim 8, wherein the source of magnetic flux includes an electromagnetic coil.

10. The driveline clutch assembly of claim 8, wherein the armature includes a shaft collar secured for rotation wit the shaft and an armature plate surrounding the shaft collar and movable relative to the input shaft and shaft collar in an axial direction.

11. The driveline clutch assembly of claim 8, wherein the armature includes a return spring attached to the armature plate and the shaft collar.

12. The driveline clutch assembly of claim 11, wherein the armature plate is adapted to move relative to the shaft collar between a first, disengaged position in the disengaged state and a second position engaged with the brake housing in the engaged state.

13. The driveline clutch assembly of claim 12, wherein the return spring is configured to bias the armature plate toward the first, disengaged position when the armature plate is moved toward the second, engaged position.

14. The driveline clutch assembly of claim 8, wherein the brake housing includes at least two sources of magnetic flux.

15. The driveline clutch assembly of claim 14, wherein the armature includes a number of slots positioned to separate lines of magnetic flux generated by a first source of magnetic flux from lines of magnetic flux generated by a second source of magnetic flux.

16. The driveline clutch assembly of claim 8, wherein the brake housing is configured to function as a transmission bearing cap.

17. The driveline clutch assembly of claim 8, wherein the brake housing is adapted to secure a quill to a transmission housing.

18. The driveline clutch assembly of claim 8, wherein the master clutch is provided in communication with a control system adapted to control operation of the clutch brake.

19. The driveline clutch assembly of claim 18, wherein the control system includes a control unit and at least one sensor adapted to determine the position of at least one of the release bearing and the release bearing actuating member and provide an output to the control unit indicative of that position.

20. The driveline clutch assembly of claim 19, wherein the sensor is one of an inductive sensor, a Hall Effect switch and a mechanical switch.

21. A combination brake and bearing cap, comprising:
a brake housing adapted to secure a component of a bearing seal, the brake housing including a bearing seal retaining surface, at least one source of magnetic flux, and a through-hole sized to allow passage of a shaft; and
an armature secured for rotation wit the shaft and positioned axially adjacent the brake housing in a disengaged state, at least a portion of the armature adapted to move axially on the shaft in the presence of magnetic flux to contact the brake housing in an engaged state to inhibit rotation of the armature and the shaft.

22. The combination brake and bearing cap of claim 21, wherein the source of magnetic flux includes an electromagnetic coil.

23. The combination brake and bearing cap of claim 21, wherein the armature includes a shaft collar secured for rotation with the shaft and an armature plate surrounding the shaft collar and movable relative to the shaft and shaft collar in an axial direction.

24. The combination brake and bearing cap of claim 23, wherein the armature includes a return spring attached to the armature plate and the shaft collar.

25. The combination brake and bearing cap of claim 24, wherein the armature plate is adapted to move relative to the shaft collar between a first, disengaged position in the disengaged state and a second position engaged with the brake housing in the engaged state.

26. The combination brake and bearing cap of claim 25, wherein the return spring is configured to bias the armature plate toward the first, disengaged position when the armature plate is moved toward the second, engaged position.

27. The combination brake and bearing cap of claim 21, wherein the brake housing includes at least two sources of magnetic flux.

28. The combination brake and bearing cap of claim 27, wherein the armature includes a number of slots positioned to separate magnetic lines of magnetic flux generated by a first source of magnetic flux from lines of magnetic flux generated by a second source of magnetic flux.

29. The clutch brake of claim 1, wherein the brake housing is separate from a bearing cap.

30. The driveline clutch assembly of claim 8, further comprising:
a transmission bearing cap; and
wherein the brake housing is physically separated from the transmission bearing cap.

* * * * *